US011992168B2

(12) United States Patent
Lee et al.

(10) Patent No.: US 11,992,168 B2
(45) Date of Patent: May 28, 2024

(54) CLEANER

(71) Applicant: LG ELECTRONICS INC., Seoul (KR)

(72) Inventors: Jongchan Lee, Seoul (KR); Geunbae Hwang, Seoul (KR); Goondong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 952 days.

(21) Appl. No.: 16/960,963

(22) PCT Filed: Jan. 9, 2019

(86) PCT No.: PCT/KR2019/000334
§ 371 (c)(1),
(2) Date: Jul. 9, 2020

(87) PCT Pub. No.: WO2019/139348
PCT Pub. Date: Jul. 18, 2019

(65) Prior Publication Data

US 2020/0337510 A1 Oct. 29, 2020

(30) Foreign Application Priority Data

Jan. 9, 2018 (KR) ........................ 10-2018-0002978

(51) Int. Cl.
*A47L 5/26* (2006.01)
*A47L 9/00* (2006.01)
(Continued)

(52) U.S. Cl.
CPC ............... *A47L 5/26* (2013.01); *A47L 9/0081* (2013.01); *A47L 9/22* (2013.01); *A47L 9/2836* (2013.01);
(Continued)

(58) Field of Classification Search
CPC . A47L 9/0081; A47L 5/26; A47L 9/22; A47L 9/2836; A47L 9/2884; G10K 11/161; G10K 2210/105
See application file for complete search history.

(56) References Cited

U.S. PATENT DOCUMENTS 5,499,423 A * 3/1996 Joo .................. G10K 11/17861
381/71.5
5,867,748 A * 2/1999 Takahashi .............. H04K 3/825
318/128
(Continued)

FOREIGN PATENT DOCUMENTS

GB 2419811 A * 5/2006 ........... A47L 9/0081
KR 20180097393 A * 8/2018

*Primary Examiner* — Marc Carlson
(74) *Attorney, Agent, or Firm* — Birch, Stewart, Kolasch & Birch, LLP

(57) ABSTRACT

To achieve the objects described above, the cleaner according to some embodiments of the present disclosure includes a main body forming an airflow path through which air is sucked and exhausted; a dust separation unit disposed in the airflow path and configured to separate dust from air; a fan module disposed in the airflow path and configured to move the air in the airflow path; and a noise control module including a speaker and a detection unit detecting noise or vibration, and configured to cause an output of the speaker to be reduced a level of the noise of at least one frequency range of 1500 Hz or less the noise generated when the fan module is operated, based on the detection signal of the detection unit. wherein the main body includes an exhaust outlet through which air in the airflow path is exhausted and a sound outlet through which the sound of the speaker is exhausted, wherein the exhaust outlet and the sound outlet look the same direction relative to the main body.

18 Claims, 12 Drawing Sheets

(51) Int. Cl.
*A47L 9/22* (2006.01)
*A47L 9/28* (2006.01)
*G10K 11/16* (2006.01)
*G10K 11/178* (2006.01)

(52) U.S. Cl.
CPC .......... *A47L 9/2884* (2013.01); *G10K 11/161* (2013.01); *G10K 11/17883* (2018.01); *G10K 2210/105* (2013.01)

(56) References Cited

U.S. PATENT DOCUMENTS

| | | | | |
|---|---|---|---|---|
| 6,014,791 | A * | 1/2000 | Nosenchuck | F04C 18/22 418/129 |
| 7,016,506 | B2 * | 3/2006 | Chiara | G10K 11/17875 381/71.4 |
| 8,331,577 | B2 * | 12/2012 | Lyon | G10K 11/17857 381/71.5 |
| 10,765,280 | B2 * | 9/2020 | Kim | A47L 9/2852 |

* cited by examiner (a) (b)

CLEANER

TECHNICAL FIELD

This disclosure relates to a noise control apparatus of a cleaner.

BACKGROUND

Cleaners can be divided into a cleaner manually handled by a human operator to clean an area to be cleaned and a robot cleaner performing cleaning while autonomously travels. In addition, the manually handled cleaner can be divided into a canister type cleaner, upright type cleaner, handy type cleaner, stick type cleaner or the like, according to the type of cleaner.

The cleaner includes an impeller providing a driving force for sucking dust and a suction motor rotating the impeller. The cleaner 1 generates noise due to the rotation of the impeller. The noise of the cleaner 1 includes a noise having a uniform frequency depending on a rotation period of the impeller 51.

Although such noise of the cleaner is generated through the exhaust outlet, since the exhaust outlet functions as a hole for exhausting air, there is a limit to have a sound insulation structure.

Meanwhile, A-weighted decibel (dBA) is often used as a unit for measuring a level of noise. The A-weighted decibel is used for correcting the intensity of the sound to a level similar to a sound level recognized by the human ear, and it is already known.

Technical Problem

It is a first object of the present disclosure to control the noise generated when a cleaner is operated without causing a poor cleaning performance.

A relatively low frequency machine sound of the audible frequency is known to cause discomfort to a user. It is a second object of the present disclosure to reduce such low frequency mechanical sound.

It is a third object of the present disclosure to prevent the quality of sound according to a result of a preset noise control from being varied depending on a position of the user's ear.

It is a forth object of the present disclosure to induce destructive interference to reduce the noise of the cleaner to be efficiently performed.

It is a fifth object of the present disclosure to prevent the performance of a speaker provided to control the noise of the cleaner from being affected by exhaust.

Technical Solution

To achieve the objects described above, the cleaner according to some embodiments of the present disclosure includes a main body forming an airflow path through which air is sucked and exhausted; a dust separation unit disposed in the airflow path and configured to separate dust from air; a fan module disposed in the airflow path and configured to move the air in the airflow path; and a noise control module including a speaker and a detection unit detecting noise or vibration, and configured to control an output of the speaker to reduce a level of the noise of at least one frequency range of 1500 Hz or less the noise generated when the fan module is operated, based on the detection signal of the detection unit. wherein the main body includes an exhaust outlet through which air in the airflow path is exhausted and a sound outlet through which the sound of the speaker is exhausted, wherein the exhaust outlet and the sound outlet look the same direction relative to the main body.

The sound outlet may be provided separately from the exhaust outlet.

The exhaust outlet and the sound outlet may be formed on the top surface of the main body. The main body may further include a handle mounted on a rear surface thereof.

The fan module may include an impeller pushing air and a suction motor rotating the impeller. The detection unit may be configured to detect a frequency of the noise or vibration of the suction motor.

The exhaust outlet may extend along a circumferential direction or be arranged along the circumferential direction by being divided into multiple parts, in a predetermined surrounding area extending above a central angle of 180 degrees along the circumferential direction about a predetermined axis. The sound outlet may be disposed in a direction opposite to a centrifugal direction of the surrounding area relative to the axis.

The sound outlet may be disposed in the direction opposite to the centrifugal direction of the surrounding area relative to the axis.

The sound outlet may be disposed in a predetermined center area which is spaced apart from the surrounding area in the direction opposite to the centrifugal direction and through which the axis passes.

The main body may include a plurality of exhaust guides for dividing the exhaust outlet into a plurality of exhaust outlet segments, such as a plurality of exhaust outlets.

The fan module may include an impeller pushing air by rotating about the axis and a suction motor rotating the impeller.

The noise control module may be configured to shift in phase a signal of at least one frequency range of 1500 Hz or less of signals detected by the detection unit and cause the speaker to output the phase shifted signal. Thus, the noise control module may be configured to cause the noise of the at least one frequency range of 1500 Hz or less of the noise emitted from the exhaust unit to be offset.

The detection unit may be disposed on a downstream portion of the fan module and on an upstream portion of the exhaust outlet, in the airflow path P.

The noise control module includes a low pass filter may be configured to pass a low frequency signal of signals detected by the detection unit, relative to a preset value of 1500 Hz or less.

The detection unit may include a microphone detecting noise. The noise control module may be configured to receive a signal detected by the microphone by a feedback path and control an output of the speaker.

The microphone may be disposed outside the exhaust outlet.

The microphone may be disposed between the exhaust outlet and the sound outlet.

The cleaner according to another embodiment of the present disclosure includes a main body forming an airflow path through which air is sucked and exhausted; a dust separation unit disposed in the airflow path and configured to separate dust from air; a fan module disposed in the airflow path and configured to move the air in the airflow path; and a noise control module including a speaker and a detection unit detecting noise or vibration, and configured to control an output of the speaker to reduce a level of the noise of at least one frequency range of 1500 Hz or less of the noise generated when the fan module is operated, based on the detection signal of the detection unit, and the main body includes an exhaust outlet through which the air in the airflow path is exhausted and a sound outlet through which the sound of the speaker is emitted, and the exhaust outlet is disposed on a surface of the main body and the sound outlet is disposed on a surface of the main body on which the exhaust outlet is disposed.

Advantageous Effects

According to some embodiments of the present disclosure, a more pleasant hearing environment can be provided to the user by controlling an output of the speaker to reduce a level of the noise of at least one frequency range of 1500 Hz or less of the noise generated when the fan module is operated, based on the detection signal of the detection unit.

According to some embodiments of the present disclosure, when the noise emitted through the exhaust outlet and the sound emitted through the sound outlet are combined with each other and reach the user's ear, by allowing the exhaust outlet and the sound outlet to face in the same direction relative to the main body, a phenomenon can be reduced that the ratio of a level of noise to a level of sound varies depending on a position of the user's ear. Thus, the sound of the speaker can be synthesized to the noise of the exhaust outlet at a predetermined ratio preset to the noise control module.

Since the sound outlet is provided separately from the exhaust outlet, prevented is the adverse effect of air or dust flowing in the airflow path on the performance of the speaker.

Since the exhaust outlet is formed on the top surface of the main body, the handle is mounted in a rear surface of the main body, the dust around the cleaner is prevented from being scattered by the air exhausted from the exhaust outlet and at the same time, the air exhausted from the exhaust outlet is prevented from directly hitting the user.

Since the exhaust outlet is disposed in the surrounding area and the sound outlet is disposed in the direction opposite to the centrifugal direction of the surrounding area, the noise of the fan module which is emitted through the exhaust outlet and the sound of the speaker which is emitted through the sound outlet can be mixed well at any position. Particularly, since the sound outlet is disposed in a center portion of the exhaust outlet, destructive interference between the noise of a low frequency range of the noise generated by the fan module and the sound of the speaker can be produced in any location outside the cleaner.

Since the impeller pushes air by rotating about the axis, noise may be relatively evenly exhausted through the exhaust outlet formed in the surrounding area about the axis.

Since the detection unit is disposed on a downstream portion of the fan module and on an upstream portion of the exhaust outlet, in the airflow path, a frequency of the noise of the fan module emitting to the exhaust outlet can be detected.

BRIEF DESCRIPTION OF DRAWINGS

FIGS. 6A and 6B illustrate different examples related to a position of a detection unit 81, and FIGS. 6A and 6C illustrate different examples related to the presence or absence of a sound conveying conduit 90.

FIG. 8*a* illustrates a noise control module 180, 380 according to a first and third embodiments, and FIG. 8*b* illustrates a noise control module 280 according to a second embodiment.

Figure 1:
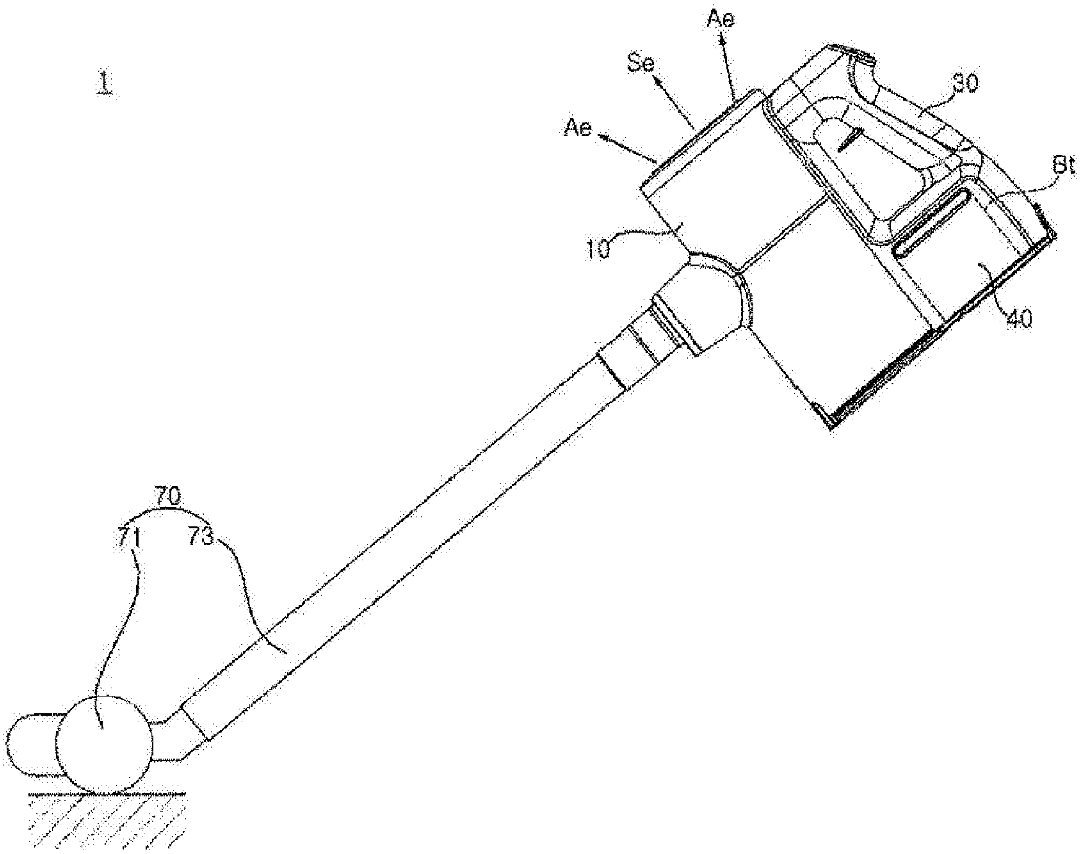
FIG. 1 is a side elevational view illustrating a state in which a cleaner 1 is used according to an embodiment of the present disclosure.

In order to distinguish between one embodiment and another embodiment, of the present disclosure, a comma (') may be displayed after the reference numerals of the parts or elements of another embodiment which are different from those of the one embodiment.

DESCRIPTION

In order to describe the present disclosure, the following description will be given with reference to a space orthogonal coordinate system of X, Y, and Z axes orthogonal to each other. Each axis direction (X axis direction, Y axis direction, Z axis direction) means both directions in which each axis extends. The plus sign in front of each axis (+X axis direction, +Y axis direction, +Z axis direction) means a positive direction, which is one of both directions in which each axis extends. The negative sign in front of each axis (−X axis direction, −Y axis direction, −Z axis direction) means a negative direction, which is one of both directions in which each axis extends.

The expression referring to the directions such as "before (+Y)/after (−Y)/left (+X)/right (−X)/upper (+Z)/lower (−Z)" which will be described below is defined with reference to XYZ coordinate axes. However, it should be understood that these expressions are used for clearly understanding, and that each direction can be defined differently as well depending on where the reference is placed.

The use of terminologies such as "first, second, third, etc." in front of elements described below is intended only to avoid confusion of elements, it is irrelevant to the order, importance, or master relationship between the elements. For example, some embodiments may include only a second element without a first element.

As used herein, the singular forms “a”, “an” and “the” include plural forms as well unless the context clearly dictates otherwise.

Cleaners according to the present disclosure include a cleaner manually handled by a human operator or a robot cleaner. Hereinafter, a cleaner 1 according to the present disclosure will be described as a handy manual cleaner, but is not intended to be limiting.

Referring to FIGS. 1 to 7, a cleaner 1 according to an embodiment includes a main body 10 having an airflow path P for guiding sucked air to the outside. The cleaner 1 includes a dust separation unit 20 disposed in the airflow path P and configured to separate dust in the air. The cleaner 1 includes a handle 30 mounted to a rear side of the main body 10. The cleaner 1 includes a battery Bt supplying power and a battery housing 40 in which the battery Bt is accommodated. The cleaner 1 includes a fan module 50, 50' disposed in the airflow path P and configured to move the air in the flow path. The cleaner 1 includes one or more filters 61, 62 disposed in the airflow path P and configured to separate dust in the air, in addition to the dust separation unit 20. The cleaner 1 includes a nozzle module 70 detachably connected to an entrance port 11 of the main body 10. The cleaner 1 includes an input unit 3 for selecting an on or off, or suction mode of the cleaner 1 and an output unit 4 for displaying various states of the cleaner 1.

The cleaner 1 includes one or more noise control modules 80, 80', 180, 280, 380, 980 performing at least one of a first function of reducing a level of the noise of a relatively low frequency of the audible frequency and a second function of increasing a level of the noise of a relatively high frequency of the audible frequency. The noise control module includes one or more speakers 89, 989 for outputting sound. According to some embodiments, the cleaner 1 may further comprise a sound conveying conduit 90 for conveying the sound of the one or more speakers 89, 989 to the sound outlet **10*b*, 10*b***.

Referring to FIG. 1, the nozzle module 70 includes a nozzle 71 for sucking outside air and an extension conduit 73 extending long from the nozzle 71. The extension conduit 73 connects the nozzle 71 and the entrance port 11. The extension conduit 73 is configured to guide the air sucked through the nozzle 71 into a suction airflow path P1. One end of the extension conduit 73 may be detachably coupled to the entrance port 11 of the main body 10. The user can clean the nozzle 71 while moving the nozzle 71 by holding a handle 30 in a state where the nozzle 71 is located on the floor.

Referring to FIGS. 2 to 7, the main body 10 forms an external shape of the cleaner 1. The main body 10 may be formed in a vertically extending cylindrical shape as a whole. A dust separation unit 20 is accommodated in the main body 10. A fan module 50, 50' is accommodated in the main body 10. The handle 30 is coupled to a rear side of the main body 10. A battery housing 40 is coupled to a rear side of the main body 10.

The main body 10 includes an entrance port 11 for guiding air to the main body 10. The entrance port 11 forms the suction airflow path P1. The entrance port 11 may protrude to the front of the main body 10.

The main body 10 includes an exhaust cover 12, 12 forming an exhaust outlet **10*a*, 10*a'*. The exhaust cover 12, 12' may further have a sound outlet 10*b*, 10*b'*. The exhaust cover 12, 12' may form the top surface of the main body 10. The exhaust cover 12, 12' covers an upper portion of a fan housing 14**.

The main body 10 includes a dust collector 13 for storing dust separated from a dust separation unit 20. At least one part of the dust separation unit 20 may be disposed in the dust collector 13. An inner surface of an upper portion of the dust collector 13 may be configured to perform the function of a first cyclone 21 described later. In this case, the upper portion of the dust collector 13 may be referred to as the first cyclone 21. A second cyclone 22 and a dust flow guide 24 are disposed inside the dust collector 13.

The dust collector 13 may be formed in a cylindrical shape. The dust collector 13 is disposed at a lower side of the fan housing 14. One or more dust storage spaces S1, S2 are formed inside the dust collector 13. A first storage space S1 is formed between the dust collector 13 and the dust flow guide 24. A second storage space S2 is formed inside the dust collector 24.

The fan housing 14 accommodating a fan module 50, 50' is disposed inside the main body 10. The fan housing 14 may extend upwardly from the dust collector 13. The fan housing 14 is formed in a cylindrical shape. An extension portion 31 of the handle 30 is disposed on a rear side of the fan housing 14

The main body 10 includes a dust cover 15 for opening and closing the dust collector 13. The dust cover 15 may be rotatably coupled to a lower side of the dust collector 13. The dust cover 15 may open or close the lower side of the dust collector 13 by rotation operation. The dust cover 15 may include a hinge for rotation. The hinge may be coupled to the dust collector 13. The dust cover 15 may open or close the first storage space S1 and the second storage space S2 together.

The main body 10 includes an air guide 16 for guiding the air having passed through the dust separation unit 20. The air guide 16 forms a fan module airflow path P4, P4' to guide the air from the dust separation unit 20 to an impeller 51, 51'. The air guide 16 includes an exhaust airflow path P5, P5' to guide the air having passed through the impeller 51, 51' to the exhaust outlet **10*a*, 10*a'*. The air guide 16 may be disposed in the fan housing 14**.

Figure 6A:
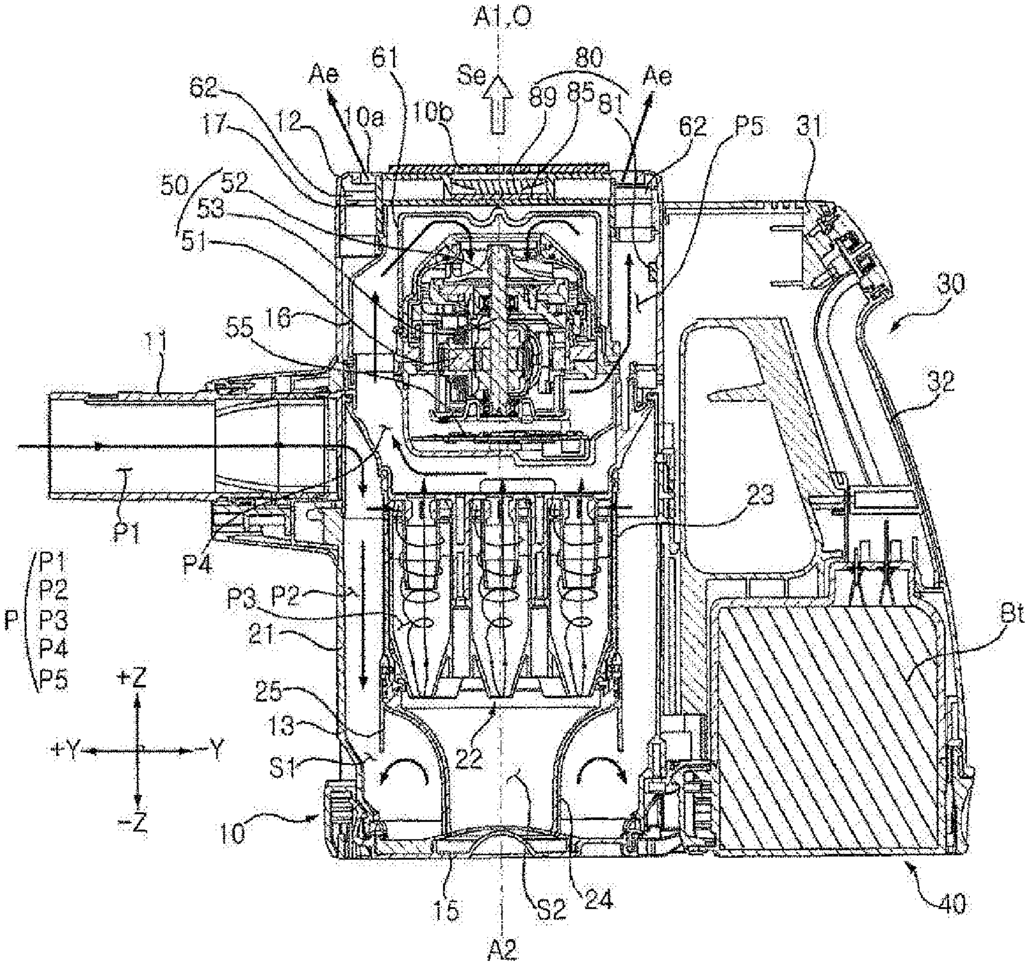
FIGS. 6A to 6C are cross-sectional views illustrating the cleaner 1 of FIG. 4*a* taken vertically along lines S2-S2'.
Figure 6B:
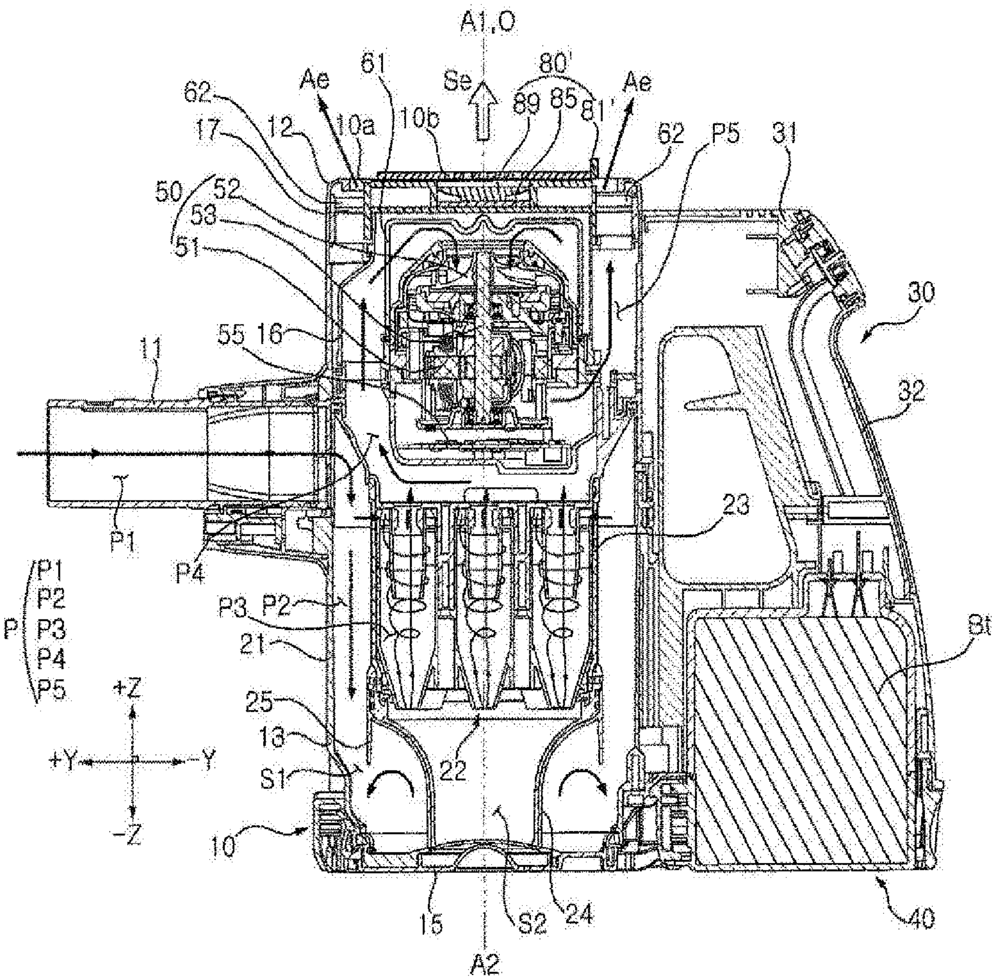
Figure 6C:
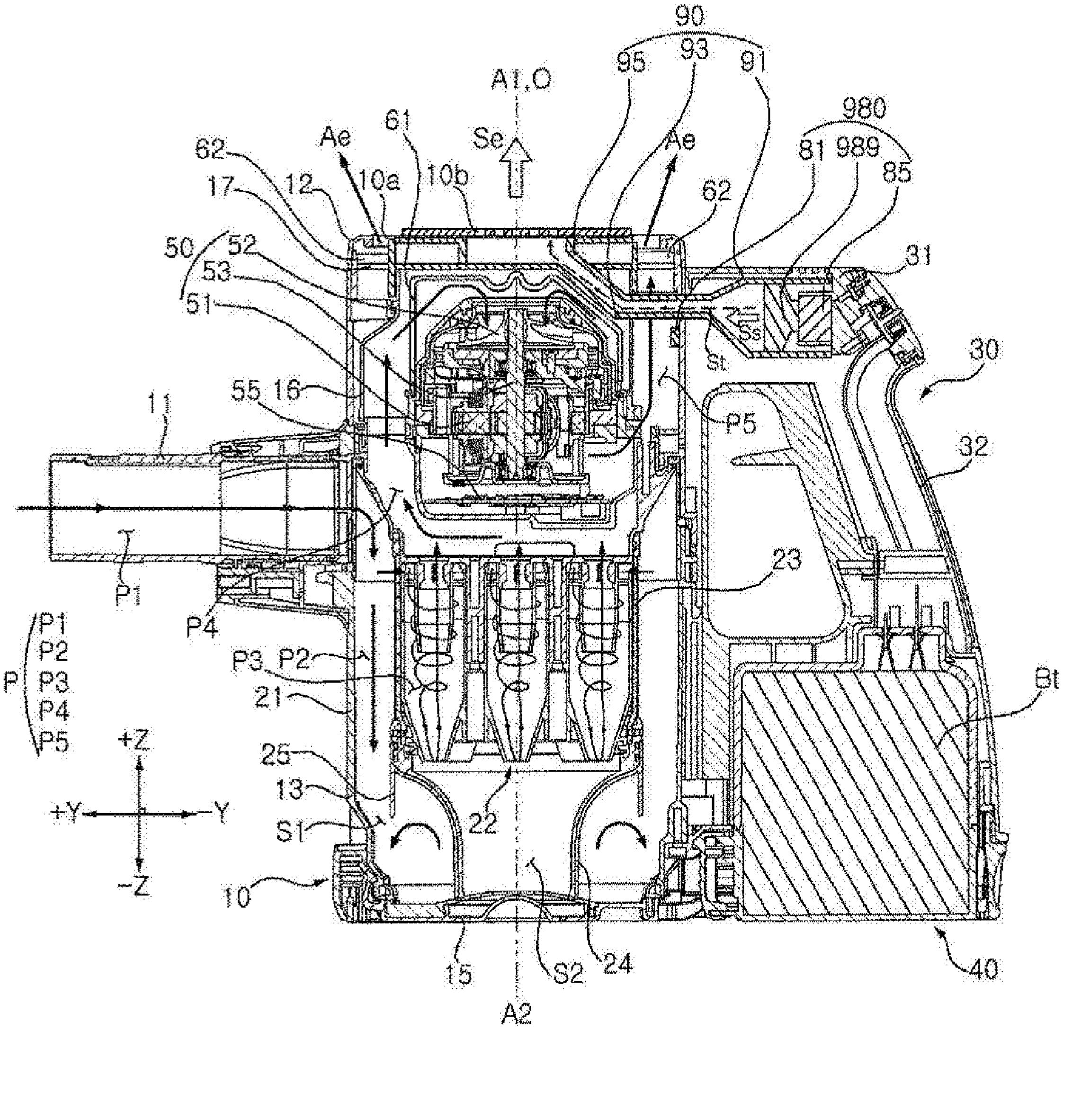

As an example, referring to FIGS. 6A to 6C, the air guide 16 may form the airflow paths P4, P5 so that the air having passed through the dust separation unit 20 ascends, then descends after passing through the impeller 51, and again ascends until the exhaust outlet **10*a*, 10*a'***.

Figure 7:
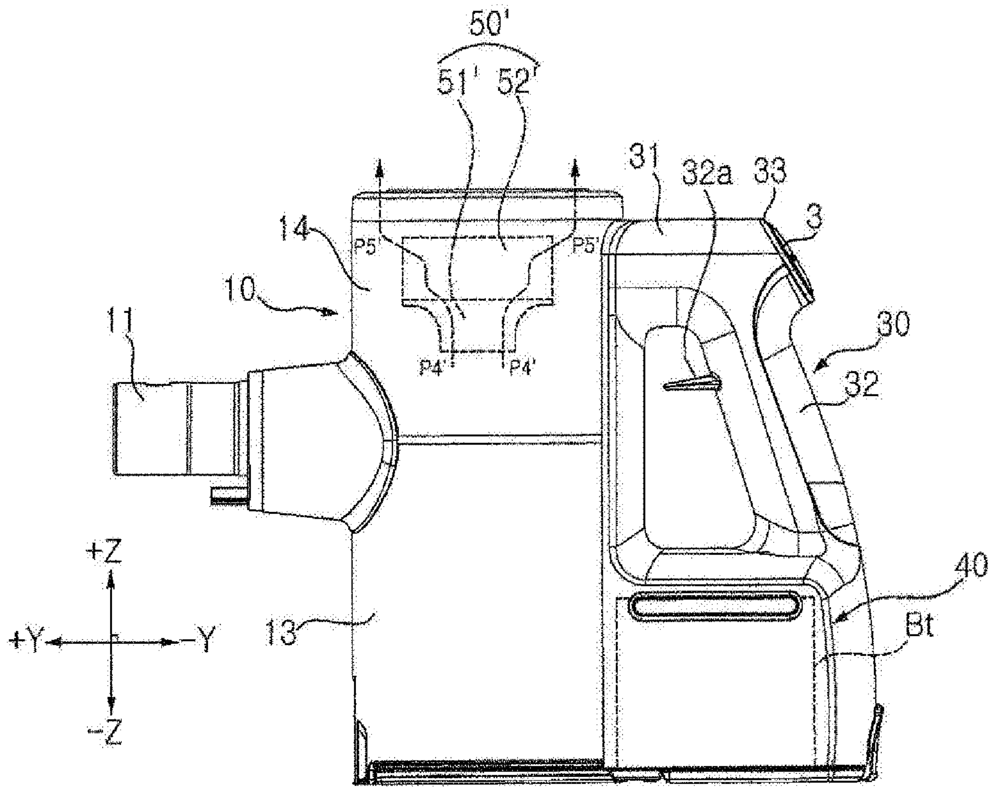
FIG. 7 is a side elevational view illustrating a fan module 50' and air flow in the cleaner 1 according to another embodiment of the present disclosure.

As another example, referring to FIG. 7, the air guide 16 may form the airflow paths P4', P5' so that the air having passed through the dust separation unit 20 continually ascends until reaching the exhaust outlet **10*a*, 10*a'* after passing through the impeller 51**.

Referring to FIGS. 2, 4A, 4B and 6A to 6C, the main body 10 includes an exhaust outlet **10*a*, 10*a'* through which air in the airflow path P is exhausted to the outside of the main body 10. The exhaust outlet 10*a*, 10*a'* may be formed in the exhaust cover 12, 12'**.

The exhaust outlet **10*a*, 10*a'* may be formed on a surface of the main body 10. The exhaust outlet 10*a*, 10*a'* may be formed on the top surface of the main body 10. Accordingly, dust around the cleaner is prevented from being scattered by the air exhausted from the exhaust outlet 10*a*, 10*a'*, and the air exhausted from the exhaust outlet 10*a*, 10*a'* is prevented from directly hitting a user. In addition, the sound outlet may be disposed on the same surface as a surface of the main body 10 on which the exhaust outlet 10*a*, 10*a'*** is formed.

The exhaust outlet 10*a*, 10*a*' may be disposed to face in a specific direction, for example, an upward direction. An exhaust direction Ae of the air exhausted from the exhaust outlet 10*a*, 10*a*' may be the specific direction.

As used herein, the term "predetermined axis O" means an imaginary axis extending across a center portion of the main body 10 in the specific direction. The term 'centrifugal direction' means a direction away from the axis O, and the term 'direction opposite to the centrifugal direction' means a direction approaching the axis O. In addition, the term 'circumferential direction' means a circumferential or rotational direction about the axis O. The circumferential direction includes clockwise and counterclockwise directions.

The exhaust direction Ae of air may be a direction between the specific direction and the centrifugal direction. The exhaust direction Ae of air may be a direction between the specific direction and the centrifugal direction. Specifically, the exhaust direction Ae of air may be a direction between the specific direction and the counterclockwise direction. The exhaust direction Ae of air may be a direction in which the specific direction, the centrifugal direction, and the circumferential direction are three-dimensionally synthesized.

The exhaust outlet 10*a*, 10*a*' may be disposed to surround the axis O. The exhaust outlet 10*a*, 10*a*' may be disposed or extend, along the circumferential direction. The exhaust outlet 10*a*, 10*a*' may be disposed in a predetermined surrounding area B1, B1' extending above a central angle of 180 degrees along the circumferential direction about the predetermined axis O.

Figure 4A:
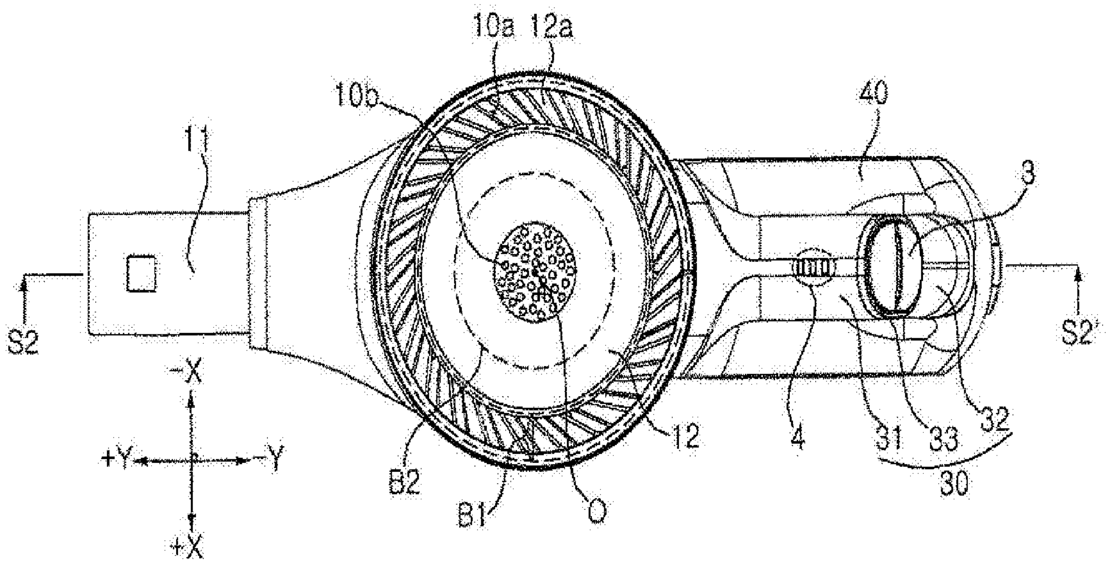
FIG. 4A is an upper elevational view illustrating the cleaner 1 of FIG. 2.

For example, referring to FIG. 4A, the surrounding area B1 may extend to a central angle of 360 degrees along the circumferential direction about the axis O. That is, in this case, the surrounding area B1 completely surrounds the circumference of the axis O.

Figure 4B:
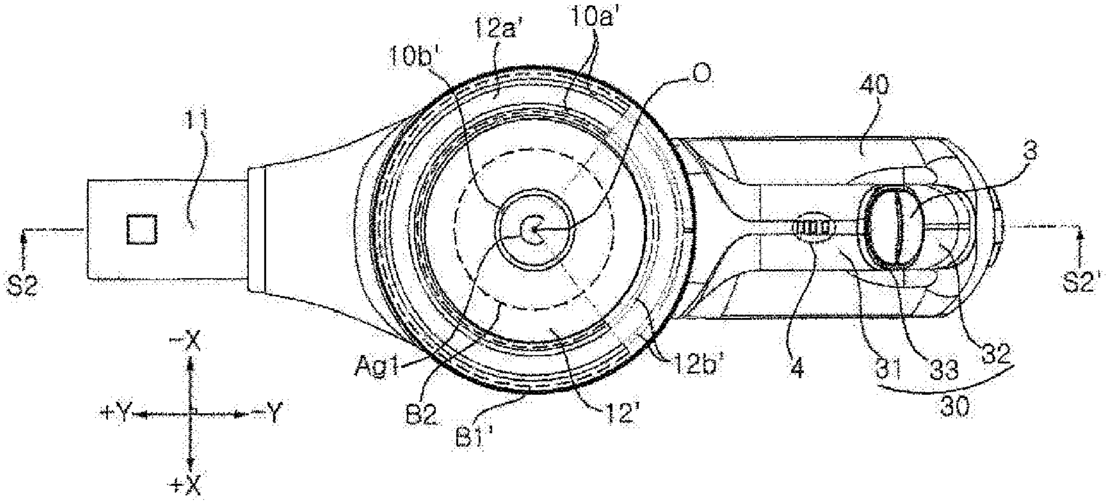
FIG. 4B is an upper elevational view illustrating the cleaner 1 according to another embodiment of the present disclosure.

For another example, referring to FIG. 4B, the surrounding area B1' may extend by a central angle of Ag1 degrees along the circumferential direction about the axis O. The central angle Ag1 may be a value of 270 degrees or more and less than 360 degrees. In FIG. 4A, the center angle Ag1 is about 270 degrees.

Meanwhile, referring to FIG. 4B, it is preferable that an area in which the surrounding area B1' does not surround relative to the axis O is located in a direction, such as a rear direction, in which the handle 30 is disposed. The exhaust outlet 10*a*' may not be formed in an area between the axis O and the handle 30 so that the air exhausted from the exhaust outlet 10*a*' is prevented from flowing to a user side. A barrier 12*b*' for blocking the exhaust of air may be provided in an area between the axis O and the handle 30. Thus, the air exhausted from the exhaust outlet 10*a*' is prevented from hitting directly the user holding the handle 30.

The exhaust outlet 10*a*, 10*a*' may extend along the circumferential direction, or be arranged along the circumferential direction by being divided into multiple parts, in the surrounding area B1, B1'.

For example, referring to FIG. 4A, a plurality of exhaust outlets 10*a* is arranged along the surrounding area B1. A plurality of exhaust outlets 10*a* is divided from one another in the circumferential direction by a plurality of exhaust guides 12*a*. The plurality of exhaust outlets 10*a* may be spaced a certain interval apart from one another along the circumferential direction.

As another example, referring to FIG. 4B, the exhaust outlets 10*a*' extends long along the surrounding area B1'. A plurality of exhaust outlets 10*a*' may be disposed apart from each other along the centrifugal direction. A plurality of exhaust outlets 10*a*' is divided from each other in the centrifugal direction by the exhaust guide 12*a*'. Each exhaust outlet 10*a*' may extend by the central angle Ag1 in the circumferential direction about the axis O.

The main body 10 includes the exhaust guide 12*a*, 12*a*' which is configured to enable the air exhausted through the exhaust outlet 10*a*, 10*a*' to be exhausted in a direction inclined relative to the axis O. The exhaust guide 12*a*, 12*a*' may be disposed such that it is inclined relative to the axis O. The exhaust cover 12, 12' may include the exhaust guide 12*a*, 12*a*' dividing the exhaust outlet 10*a*, 10*a*' into multiple parts, such as a plurality of exhaust outlets 10*a*, 10*a*'.

For example, referring to FIG. 4A, the exhaust cover 12 includes a plurality of exhaust guides 12*a* that divide the exhaust outlet 10*a* into a plurality of exhaust outlets. The plurality of exhaust guides 12*a* is spaced apart along the circumferential direction. Each exhaust guide 12*a* extends in a direction between the circumferential direction and the centrifugal direction and divides the adjacent two exhaust outlets 10*a*. A space spaced apart between the two adjacent exhaust guides 12*a* serves as an exhaust outlet 10*a*. The exhaust guide 12*a* guides air to be exhausted in a direction in which the specific direction, the centrifugal direction, and the circumferential direction are three-dimensionally synthesized.

As another example, referring to FIG. 4B, the exhaust cover 12' includes one exhaust guide 12*a*' dividing the exhaust outlet 10*a*' into two parts. The exhaust guide 12*a*' extends long along the circumferential direction. The exhaust guide 12*a*' extends from the one end of the barrier 12*b*' to the other end by the central angle Ag1 in the circumferential direction about the axis O. The exhaust guide 12*a*' guides air to be exhausted in a direction in which the specific direction and the centrifugal direction are synthesized.

Referring to FIGS. 2, 4A, 4B and 6A to 6C, the main body 10 forms the sound outlet 10*b*, 10*b*' through which the sound of one or more speakers 89 and 989 is emitted. The sound outlet 10*b*, 10*b*' may be formed in the exhaust cover 12, 12'.

The sound outlet 10*b*, 10*b*' may be formed on the top surface of the main body 10. The sound outlet 10*b*, 10*b*' may be disposed such that it faces in a specific direction, for example, not limited to, an upward direction. An exhaust direction Se of the sound emitted through the sound outlet 10*b*, 10*b*' becomes the specific direction.

The sound outlet 10*b*, 10*b*' is preferably provided separately from the exhaust outlet 10*a*, 10*a*'. Because of this, the air or dust moving in the airflow path P is prevented from affecting the performance of the one or more speakers 89 and 989.

It is preferable that the exhaust outlet 10*a*, 10*a*' and the sound outlet 10*b*, 10*b*' face in the same direction relative to the main body 10. Because of this, when the noise emitted through the exhaust outlet 10*a*, 10*a*' is combined with the sound emitted through the sound outlet 10*b*, 10*b*' to reach the user's ear, an instance where the ratio of a level of noise to a level of sound varies can be reduced, according to the position of the user's ear, and the sound can be synthesized to the noise at a preset ratio.

The sound outlet 10*b*, 10*b*' may be disposed in a center portion of the exhaust cover 12, 12'. The sound outlet 10*b*, 10*b*' may be arranged in the direction opposite to the centrifugal direction of the surrounding area B1, B1' with respect to the axis O. The sound outlet 10*b*, 10*b*' may be disposed at a center portion through which the axis O passes. The sound outlet 10*b*, 10*b*' may be spaced apart in the direction opposite to the centrifugal direction from the surrounding area B1, B1' and disposed in a predetermined center area B2 through which the axis O passes. Thereby, it is possible to place the center portion of a noise generation area by the exhaust outlet 10*a*, 10*a*' in a sound generation area by the sound outlet 10*b*, 10*b*' and destructive or constructive interference between the noise by the exhaust outlet 10*a*, 10*a*' and the sound by the one or more speaker 89, 989) may be produced at a preset ratio. This is particularly effective in offsetting the noise of a low frequency range of the generated noise with a 180-degree phase shifted sound by the one or more speakers 89, 989, which may be destructive interference.

Figure 2:
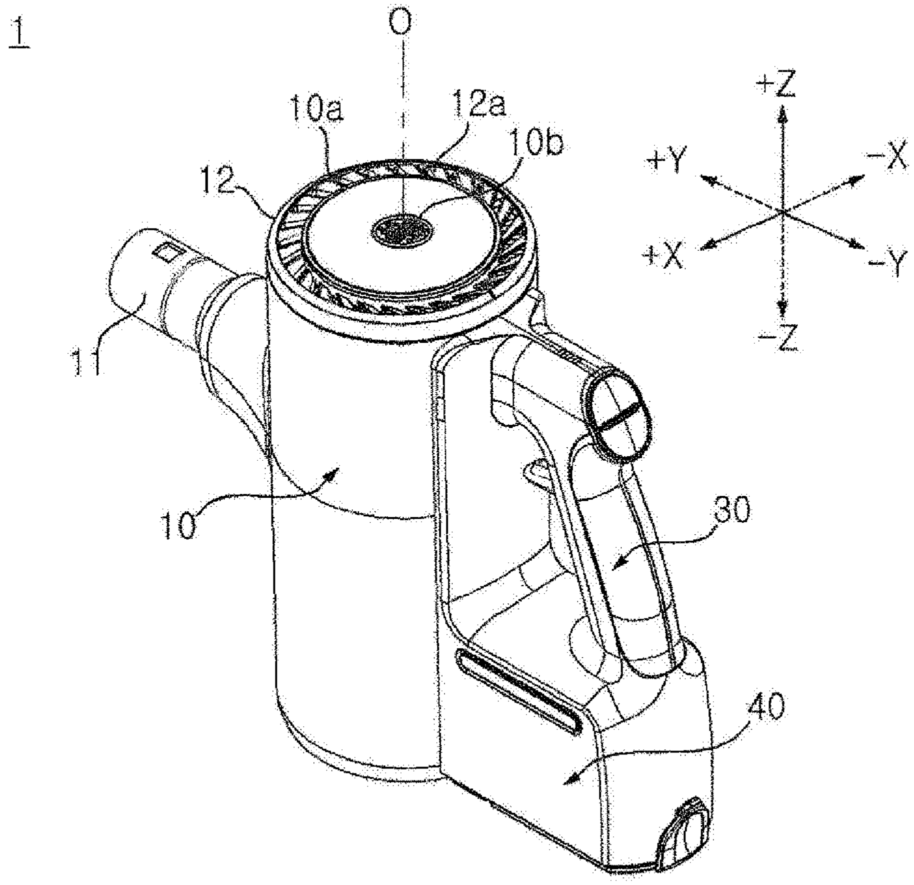
FIG. 2 is a perspective view illustrating the cleaner 1 in which a nozzle module 70 of FIG. 1 is removed.
Figure 3:
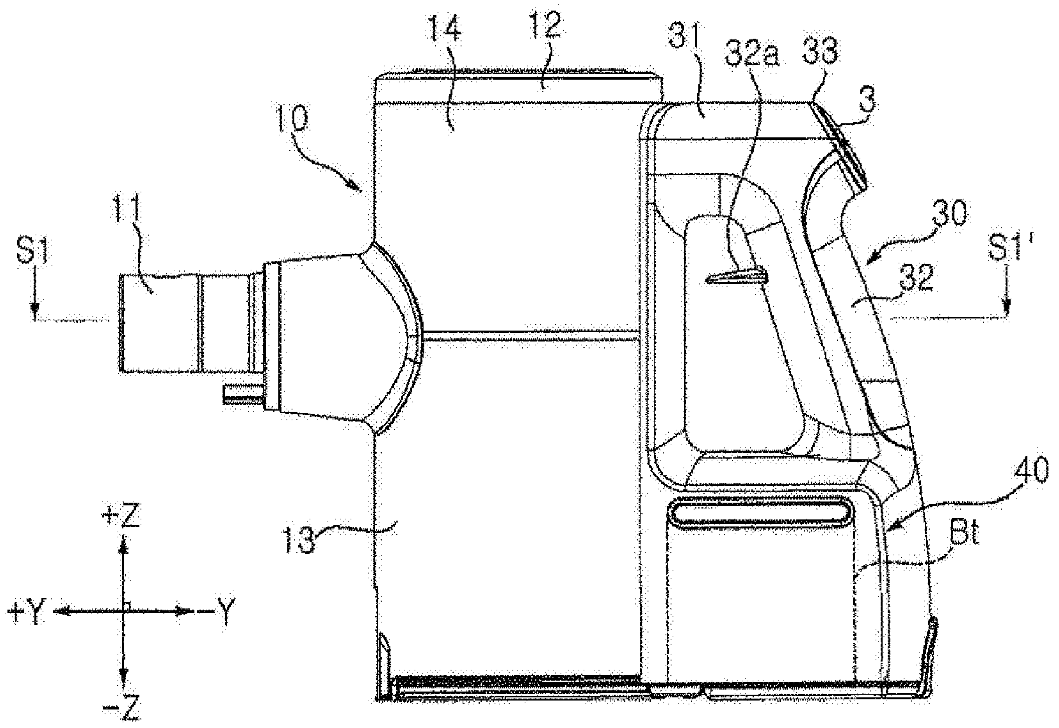
FIG. 3 is a side elevational view illustrating the cleaner 1 of FIG. 2.

For example, referring to FIG. 2, the sound outlet 10*b* may include a plurality of holes spaced apart from one another in the center area B2.

As another example, referring to FIG. 4B, a mesh type structure is disposed in the center area B2, and a large number of holes formed by the mesh type structure can perform the function of the sound outlet 10*b*.

As further another example, referring to FIG. 4B, the sound outlet 10*b*' may include a gap extending long in the circumferential direction about the axis O in the center area B2. Specifically, the sound outlet 10*b*' may include a ring-shaped gap.

Figure 5:
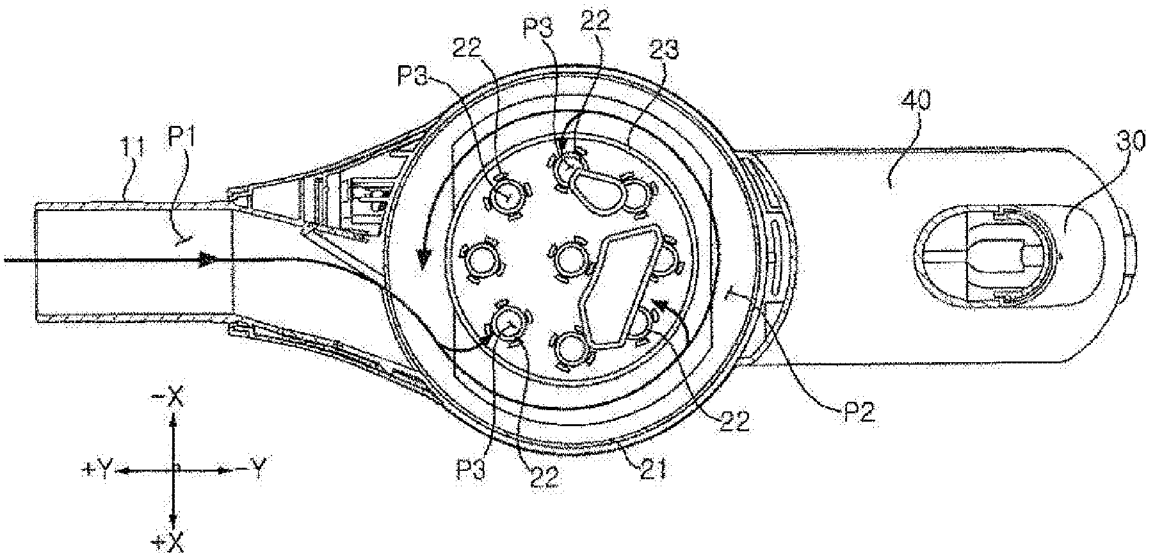
FIG. 5 is a cross-sectional view illustrating the cleaner 1 of FIG. 3 taken horizontally along lines S1-S1'.

Referring to FIGS. 5 to 6C, the dust separation unit 20 performs a function of filtering dust in the airflow path P. The dust separation unit 20 separates dust sucked into the main body 10 through the entrance port 11 from air.

For example, the dust separation unit 20 may include a first cyclone 21 and a second cyclone 22 capable of separating dust by cyclone airflow. An airflow path P2 formed by the first cyclone 21 can be connected to an airflow path P1 formed by the entrance port 11. The air and dust sucked through the entrance port 11 flow spirally along an inner circumferential surface of the first cyclone 21. An axis A2 of the cyclone airflow of the first cyclone 21 can extend in the vertical direction. The axis A2 of the cyclone airflow may coincide with the axis O. The second cyclone 22 further separates dust from the air having passed through the first cyclone 21. The second cyclone 22 may be located inside the first cyclone 21. The second cyclone 22 may be located inside a boundary member 23. The second cyclone 22 may include a plurality of cyclone bodies which are arranged in parallel.

As another example, the dust separation unit 20 may have a single cyclone. In this case, the axis A2 of the cyclone airflow may extend in the vertical direction.

As further another example, the dust separation unit 20 may include a main filter unit instead of the cyclone. The main filter unit can separate dust from the air passing through the entrance port 11.

Hereinafter, the dust separation unit 20 will be described with reference to a preferred embodiment including the first cyclone 110 and the second cyclone 130, but the present disclosure is not limited thereto.

The dust separation unit 20 forms dust separation airflow paths P2 and P3. Air moves at high speed through the dust separation airflow paths P2 and P3, and then the dust in the air is separated and the separated dust is stored in a first container S1.

A space between an inner circumferential surface of the first cyclone 21 and an outer circumferential surface of the boundary member 23 serves as an airflow path P2 of the first cyclone. The air having passed through a suction airflow path P1 moves in the downward spiral direction from the airflow path P2 of the first cyclone, and the dust in the air is centrifuged. Here, the axis A2 serves as the axis A2 of the airflow of the downward spiral direction.

The dust separation unit 20 includes the boundary member 23 arranged in a cylindrical shape inside the first cyclone 21. The boundary member 23 includes a plurality of holes formed on the outer circumferential surface. The air in the airflow path P2 of the first cyclone may pass through the plurality of holes of the boundary member 23 and flow into the airflow path P3 of the second cyclone. Bulky dust may also be filtered by the plurality of holes of the boundary member 23.

An upper portion of the second cyclone 22 is disposed inside the boundary member 23. The second cyclone 22 includes a plurality of cyclone bodies that are hollow inside and penetrated up and down. Each cyclone body may be formed in a pipe shape that tapers downward. The airflow path P3 of the second cyclone is formed inside each cyclone body. The air having passed through the boundary member 23 moves to the airflow path P3 of the second cyclone along a guide, for guiding the air to flow in a downward spiral direction, disposed at an upper side of the cyclone body. The air moves spirally downward along the inner circumferential surface of the cyclone body, and then dust in the air is centrifuged and the separated air is stored in a second container S2. The air that has moved up to a lower side of the cyclone body along the airflow path P3 of the second cyclone moves upward in the upward direction along the vertical axis of the airflow path P3 of the second cyclone, and flows into the fan module airflow path P4, P4'.

The dust separation unit 20 includes the dust flow guide 24 separating the first storage space S1 and the second storage space S2 in the dust collector 13. A space between the dust flow guide 24 and an inner surface of the dust collector 13 serves as the first storage space S1. An inside space of the dust collector 24 serves as the second storage space S2.

The dust flow guide 24 is coupled to a lower side of the second cyclone 22. The dust flow guide 24 contacts an upper surface of the dust cover 15. A portion of the dust flow guide 24 may be formed to have a reduced diameter from the upper side to the lower side. For example, an upper portion of the dust flow guide 24 may be formed to have a reduced diameter toward the lower side, and a lower portion of the dust flow guide 24 may have a cylindrical shape extending upwardly and downwardly.

The dust separation unit 20 may include a scattering prevention rib 25 extending downwardly from the upper end of the dust flow guide 24. The circumference of the upper part of the dust flow guide 24 may be surrounded. The scattering prevention rib 25 may extend in the circumferential direction about the axis A2 of the airflow. For example, the scattering prevention rib 25 may be formed in a cylindrical shape.

A space is formed between the outer circumferential surface of the upper portion of the dust flow guide 24 and the scattering prevention rib 25 when the upper side of the dust flow guide 24 has a reduced diameter toward the lower side. The rising dust due to a space between the scattering prevention rib 25 and the upper side of the dust flow guide 24 gets caught when air flows upwardly along the dust flow guide 24 in the first container S1. Accordingly, the dust in the first container S1 is prevented from flowing backwards upward.

The handle 30 is coupled to the main body 10. The handle 30 may be coupled to a rear side of the main body 10. The handle 30 may be coupled to an upper side of the battery housing 40.

The handle 30 includes an extension portion 31 protruding rearward from the main body 10. The extension portion 31 may extend forwardly from the upper side of an additional extension portion 32. The extension portion 31 may extend in the horizontal direction. In a preferred embodiment B, which will be described later, a speaker 989 is disposed inside the extension portion 31.

The handle 30 extends in the vertical direction and includes the additional extension portion 32. The additional extension portion 32 may be spaced apart from the main body 10 in the front-rear direction. The user can use the cleaner 1 by holding the additional extension portion 32. An upper end of the additional extension portion 32 is connected to a rear end of the extension portion 31. A lower end of the additional extension portion 32 is connected to the battery housing 40.

The additional extension portion 32 is provided with a movement restriction member 32*a* for preventing the hand from moving in the longitudinal direction, the up and down direction, of the additional extension portion 32 in a state where the user holds the additional extension portion 32. The movement restriction member 32*a* may protrude forward from the additional extension portion 32.

The movement restriction member 32*a* is spaced apart up and down from the extension portion 31. In a state where the user holds the additional extension portion 32, some fingers of the user's hand are positioned at an upper portion of the movement restriction member 32*a* and the remaining fingers are positioned at a lower portion of the movement restriction member 32*a*.

The handle 30 may include an inclined surface 33 facing a direction between an upper side and a rear side. The inclined surface 33 may be positioned on a rear side of the extension portion 31. An input unit 3 may be disposed on the inclined surface 33.

The battery Bt may supply power to the fan module 50, 50'. The battery Bt may supply power to the noise control module. The battery Bt may be detachably disposed inside the battery housing 40.

The battery housing 40 is coupled to a rear side of the main body 10. The battery housing 40 is disposed on a rear side of the handle 30. The battery Bt is accommodated inside the battery housing 40. The battery housing 40 may be provided with a heat dissipation hole for exhausting heat generated from the battery Bt to the outside Referring to FIGS. 6A to 7, the fan module 50, 50' generates a suction force by which external air is introduced into the airflow path P. The fan module 50, 50' is disposed in the main body 10. The fan module 50, 50' is disposed at a lower vertical height than the sound outlets 10*b*, 10*b*'. The fan module 50, 50' is disposed at an upper vertical height than the dust separation unit 20.

The fan module 50, 50' includes an impeller 51, 51' which generates a suction force by rotation. The impeller 51, 51' pushes air, by that the air in the airflow path P is exhausted through the exhaust outlet 10*a*, 10*a*'. When the impeller 51, 51' pushes air, noise and vibration are generated, and such noise is mainly emitted through the exhaust outlet 10*a*, 10*a'*.

An extension line of a rotation axis A1 of the impeller 51, 51', which may be referred to as an axis of a suction motor, may coincide with the axis A2 of the airflow.

In addition, the rotation axis A1 may coincide with the axis O. In this case, the impeller 51, 51' rotates about the axis O to push air. As a result, noise may be relatively evenly exhausted through the exhaust outlet 10*a*, 10*a*' formed in the surrounding area B1, B1'.

The fan module 50, 50' includes a suction motor 52, 52' rotating the impeller 51. The suction motor 52, 52' may be the only motor of the cleaner 1. The suction motor 52, 52' may be disposed at an upper vertical height than the dust separation unit 20. When the suction motor 52, 52' is operated, noise and vibration are generated, and such noise is mainly emitted through the exhaust outlet 10*a*, 10*a'*.

For example, referring to FIGS. 6A to 6C, a fan module 50 having the impeller 51 disposed under the suction motor 52 may be provided. The impeller 51 pushes air upwardly when rotating.

As another example, referring to FIG. 7, a fan module 50' having the impeller 51' disposed under the suction motor 52' may be provided. The impeller 51' pushes air downwardly when rotating.

The fan module 50, 50' may include a shaft 53 installed in the center of the impeller 51, 51'. The shaft 53 extending in the vertical direction is arranged on the rotation axis A1. The shaft 53 may perform a function of a shaft for the suction motor 52.

Meanwhile, the cleaner 1 may include a PCB 55 to control the suction motor 52, 52'. The PCB 55 may be disposed between the suction motor 52 and the dust separation unit 20.

FIGS. 6A to 6C, the cleaner 1 may include a pre-filter 61 filtering air before air is introduced into the suction motor 52, 52'. The pre-filter 61 may be arranged to surround the impeller 51. Air in the fan module airflow path P4, P4' passes through the pre-filter 61 and reaches the impeller 51. The pre-filter 61 is disposed inside the main body 10. The pre-filter 61 is disposed at a lower vertical height than the exhaust cover 12, 12'. The user can pull the pre-filter 61 out of the inside of the main body 10 by separating the exhaust cover 12, 12' from the cleaner 1.

Referring to FIGS. 6A to 6C, the cleaner 1 may include a HEPA (high efficiency particulate air) filter 62 filtering air before the air is exhausted to the exhaust outlet 10*a*, 10*a*'. The air having passed through the impeller 51, 51' may be exhausted to the outside through the exhaust outlet 10*a* after passing through the HEPA filter 62. The HEPA filter 62 is disposed in an exhaust airflow path P5.

The exhaust cover 12, 12' may include a filter accommodating space for receiving the HEPA filter 62. Since the filter accommodating space is formed such that the bottom surface thereof is open, the HEPA filter 62 may be accommodated in the filter accommodating space at a lower vertical height than the exhaust cover 12, 12'.

The exhaust outlet 10*a* may be disposed such that it faces the HEPA filter 62. The HEPA filter 62 is disposed at a lower vertical height than the exhaust outlet 10*a*, 10*a*'. The HEPA filter 62 may be arranged such that it extends in the circumferential direction along the exhaust outlet 10*a*, 10*a'*.

The main body 10 includes a filter cover 17 covering a lower surface of the HEPA filter 62. In a state where the HEPA filter 62 is accommodated in the filter accommodating space, a lower portion of the HEPA filter 62 is covered by the filter cover 17 and the filter cover 17 is provided with a hole for passing of the air in the exhaust airflow path P5. The filter cover 17 may be detatchably coupled to the exhaust cover 12, 12'.

The exhaust cover 12, 12' may be detatchably coupled to the fan housing 14. When the filter cover 17 is released from the exhaust cover 12, 12' in a state where the exhaust cover 12, 12' is released from the fan housing 14, the HEPA filter 62 may be withdrawn from the filter accommodating space.

Although the cleaner 1 including the pre-filter 61 and the HEPA filter 62 has been described in the above embodiments, the type and number of filters are not limited thereto.

Meanwhile, an input unit 3 may be positioned on an opposite side of the movement restriction member 32*a* relative to the handle 30. The input unit 3 may be disposed on the inclined surface 33.

In addition, an output unit 4 may be disposed in the extension portion 31. For example, the output unit 4 may be disposed on the top surface of the extension portion 31. The output unit 4 may include a plurality of light emitting units. The plurality of light emitting units may be spaced apart from each other in a longitudinal direction, a front-rear direction, of the extension portion 31.

Meanwhile, referring to FIGS. 5 to 7, the airflow path P is formed by sequentially connecting the suction airflow path P1, the dust separation airflow paths P2 and P3, the fan module airflow path P4, P4', and the exhaust airflow path P5, P5'.

Air and dust sucked through the suction airflow path P1 by operation of the suction motor 52, 52' flow through the airflow path P2 of the first cyclone and the airflow path P3 of the second cyclone and are separated from each other. The air in the airflow path P3 of the second cyclone moves upwardly as described above, and flows into the fan module airflow path P4, P4'. The fan module airflow path P4, P4' guides air to the pre-filter 61. The air that has passed sequentially through the pre-filter 61 and the impeller 51 flows into the exhaust airflow path P5, P5'. The air in the exhaust airflow path P5, P5' is exhausted to the outside through the exhaust outlet 10*a*, 10*a'* after having passed through the HEPA filter 62.

For example, referring to FIGS. 6A to 6*c*, the fan module airflow path P4 guides air so that the air having passed through the dust separation unit 20 ascends and thereafter, descends while passing through the impeller 51. In this case, the exhaust airflow path P5 guides air so that the air descended through the impeller 51 ascends again up to the exhaust outlet 10*a*, 10*a'*.

As another example, referring to FIG. 7, the fan module airflow path P4' guides air so that the air having passed through the dust separation unit 20 ascends continually while passing through the impeller 51. In this case, the exhaust airflow path P5' guides the air so that the air ascended through the impeller 51 ascends continually up to the exhaust outlet 10*a*, 10*a'*.

Hereinafter, one or more noise control modules 80, 80', 180, 280, 380 and 980 will be described with reference to FIGS. 6A to 6*c* and FIGS. 8 to 10. A noise control module can reduce, or control the quality of the sound of, the noise emitted to the exhaust outlet 10*a*, 10*a'*. The noise control module includes one or more speakers 89, 989 for outputting sound.

The noise control module is configured to perform either a first function of controlling an output of the one or more speaker 89, 989 to reduce a level of the noise of at least one frequency range of 1500 Hz or less of the noise generated during operation of the fan module 50, 50', or a second function of controlling an output of the one or more speaker 89, 989 to increase a level of the noise of at least one frequency range of 2000 Hz or more and 8000 Hz or less, when the fan module 50, 50' is operated.

Hereinafter, a noise control module 180 according to a first embodiment performing only the first function, a noise control module 280 according to a second embodiment performing only the second function, and a noise control module 380 according to a third embodiment performing both the first function and the second function will be separately described.

The noise control module 180 according to the first embodiment is configured to control the intensity of the noise in a low frequency range of the noise emitted from the exhaust outlet 10*a*, 10*a'* to be reduced. The noise control module 180 is configured to control an output of the one or more speaker 89, 989 to reduce a level of the noise of at least one frequency range of 1500 Hz or less of the noise generated when the fan module 50, 50' is operated, based on the detection signal of the detection unit 81, 81'. The noise control module 180 is configured to control the noise of at least one frequency range of 1500 Hz or less of the noise emitted from the exhaust outlet to be offset by an output of the one or more speakers 89 and 989. A sound output from the one or more speakers 89 and 989 of the noise control module 180 decreases an average dBA of the noise of 1500 Hz or less generated when the fan module is operated. As a result, a low frequency mechanical sound causing discomfort to the user can be reduced.

When the impeller 51 of the fan module 50, 50' rotates at a constant speed, a relatively constant level of noise is generated. When a sound signal shifted in phase by 180 degrees relative to the noise signal resulted from the impeller 51 is generated, the noise signal of the impeller 51 and the noise signal generated from the 180-degree phase shift destructively interfere with each other, and thereby an overall noise level is reduced.

The noise control module 180 includes a detection unit 81, 81' detecting noise or vibration. The detection unit 81, 81' is configured to detect a frequency of the noise or vibration of the suction motor 52, 52'.

As an example, the detection unit 81, 81' may include a microphone detecting the noise of the fan module 50, 50'.

As another example, the detection unit 81, 81' may include an acceleration sensor detecting the vibration of the fan module 50, 50'. Since the frequency of noise can be indirectly recognized based on the frequency of vibration detected by the acceleration sensor, the microphone can be replaced by the acceleration sensor.

The detection unit 81, 81' is disposed in the main body 10.

For example, referring to FIG. 6A, the detection unit 81 may be disposed inside the main body 10. The detection unit 81 may be disposed inside the fan module housing. The detection unit 81 may be disposed in the airflow path P. The detection unit 81 may be disposed in the exhaust airflow path P5. In this case, the detection unit 81' is preferably a microphone. In FIG. 6A, illustrated is the noise control module 80 including the detection unit 81.

As another example, referring to FIG. 6B, the detection unit 81' may be disposed outside the main body 10. The detection unit 81' may be disposed outside the exhaust outlet 10*a*, 10*a'*. The detection unit 81' may be disposed between the exhaust outlet 10*a*, 10*a'* and the sound outlet 10*b*, 10*b'*. In this case, the detection unit 81' is preferably a microphone. In FIG. 6A, illustrated is the noise control module 80' including the detection unit 81'.

As another example, the detection unit may be disposed in the fan module 50, 50'. The detection unit may be disposed in the suction motor 52, 52'. In this case, the detection unit is preferably an acceleration sensor.

Figure 8:
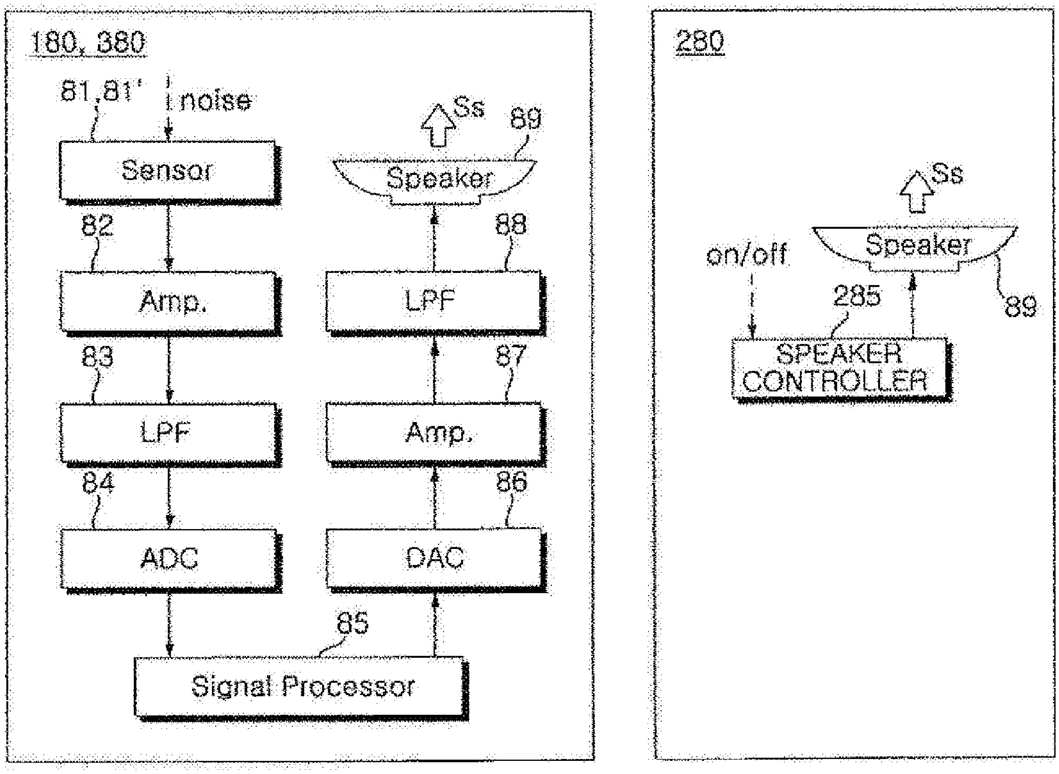
FIG. 8 is a control block diagram illustrating a noise control module 180, 280, 380 according to embodiments.

Referring to FIG. 8(*a*), the noise control module 180 includes a first amplifier 82, a first low pass filter 83, an analog-to-digital converter 84, a signal processor 85, a digital-to-analog converter (DAC) 86, a second amplifier 87, and a second low pass filter 88. for sequentially processing a signal detected by the detection unit 81, 81'.

According to a method for controlling an output of the one or more speakers 89 and 989 by processing a signal detected by the detection unit 81, 81', following exemplary embodiments 1-1, 1-2 and 1-3 will be performed.

In the embodiment 1-1, the noise control module 180 is configured to shift in phase a signal (hereinafter, simply refer to as "reduction target signal") of at least one frequency range of 1500 Hz or less of signals detected by the detection unit 81, 81', and then cause the one or more speaker 89, 989 to output the phase shifted signal. At this time, the detected signal by the detection unit 81, 81' includes a frequency of the noise of the fan module 50, 50' or a frequency of the vibration of the fan module 50, 50'. For example, the noise control module 180 may be configured to shift in phase the reduction target signal by 180 degrees and cause the one or more speakers 89 and 989 to output the phase shifted signal.

In the embodiment 1-1, the detection unit 81, 81' may be disposed on a downstream portion of the fan module and on an upstream portion of the exhaust outlet, in the airflow path P. As a result, a noise frequency of the fan module 50, 50' emitted to the exhaust outlet 10*a*, 10*a'* can be detected. As another example, the detection unit 81, 81' may be an acceleration sensor, and disposed in the suction motor 52, 52' and configured to detect the vibration frequency of the fan module 50, 50'.

Referring to FIG. 8(*a*), in the embodiment 1-1, an amplifier 82 amplifies a signal detected by the detection unit 81, 81'. A first low pass filter (LPF) 83 is configured to pass only a predetermined low frequency signal of the signals amplified by the amplifier 82. The low pass filter 83 may be configured to pass a low frequency signal of signals detected by the detection unit 81 or 81', relative to a preset value of 1500 Hz or less. For example, the preset value may be a specific value between about 1300 Hz and 1500 Hz. An analog-to-digital converter (ADC) 84 is configured to convert the low frequency signal having passed through the low pass filter 83 into a digital signal. A signal processor 85 is configured to generate a control signal having a phase difference of 180° from the signal detected by the detection unit 81 or 81' based on the digital signal converted by the analog-to-digital converter 84. That is, the signal processor 85 may generate a reverse-phase control signal relative to the detection signal. The signal processor 85 may include a digital signal processor. The signal processor 85 may include an active noise control filter (ANC filter). A digital-analog converter (DAC) 86 is configured to convert the digital control signal output from the signal processor 85 into an analog signal. An amplifier 87 amplifies the analog signal converted by the digital-to-analog converter 86. A second low pass filter (LPF) 88 is configured to filter the signal amplified by the amplifier 87 and pass a low frequency signal. The second low pass filter 88 may be configured to perform a function of smoothing a control signal converted into an analog signal. The speaker 89 is configured to output the filtered signal from the second low-pass filter 88.

In the embodiment 1-2, the detection unit 81, 81' includes a microphone for detecting noise. The noise control module 180 is configured to control an output of the one or more speakers 89 and 989 based on a feedback signal received from the microphone 81, 81'. In this case, the microphone 81' is preferably disposed outside the exhaust outlet 10*a*, 10*a'*. More preferably, the microphone 81' may be disposed between the exhaust outlet 10*a*, 10*a'* and the sound outlet 10*b*, 10*b'*. In this way, a synthesized signal of an output sound of the one or more speakers 89 and 989 and the sound emitted through the exhaust outlet 10*a*, 10*a'* can be detected, and thus the synthetic signal is fed back and used to control the output of the one or more speakers 89 and 989. This is a feedback scheme by an error-detecting microphone. This is a method of detecting a value of the synthesized signal and controlling an output of the speaker inversely. In this embodiment, the elements 81', 82, 83, 84, 85, 86, 87, 88 and 89 as in FIG. 8*a* sequentially process a signal. In this case, the signal processor 85 is configured to receive the detection signal from the microphone through a feedback path, change a control signal based on the received the detection signal, and output the changed control signal. Thus, the signal processor 85 causes the detection signal to be used for controlling an output of the speaker.

In the embodiment 1-3, the detection unit 81, 81' includes two microphones. A first microphone 81 may be disposed in the exhaust airflow path P5 and a second microphone 81' may be disposed on the outside of the exhaust outlet 10*a*, 10*a'*. As described above referring to FIG. 8(*a*), a signal detected by each microphone 81, 81' passes through the amplifier 82, the first low pass filter 83, the analog-to-digital converter 84, sequentially, and then is input to the signal processor 85. The signal processor 85 is configured to generate a control signal by shifting in phase a signal detected by the first microphone 81, and to do this, at the same time, receive a signal detected by the second microphone 81' through a feedback path. The control signal generated by the signal processor 85 passes through the elements 86, 87 and 88 described above, and thus a sound output of the one or more speakers 89 and 989 is performed.

Figure 9:
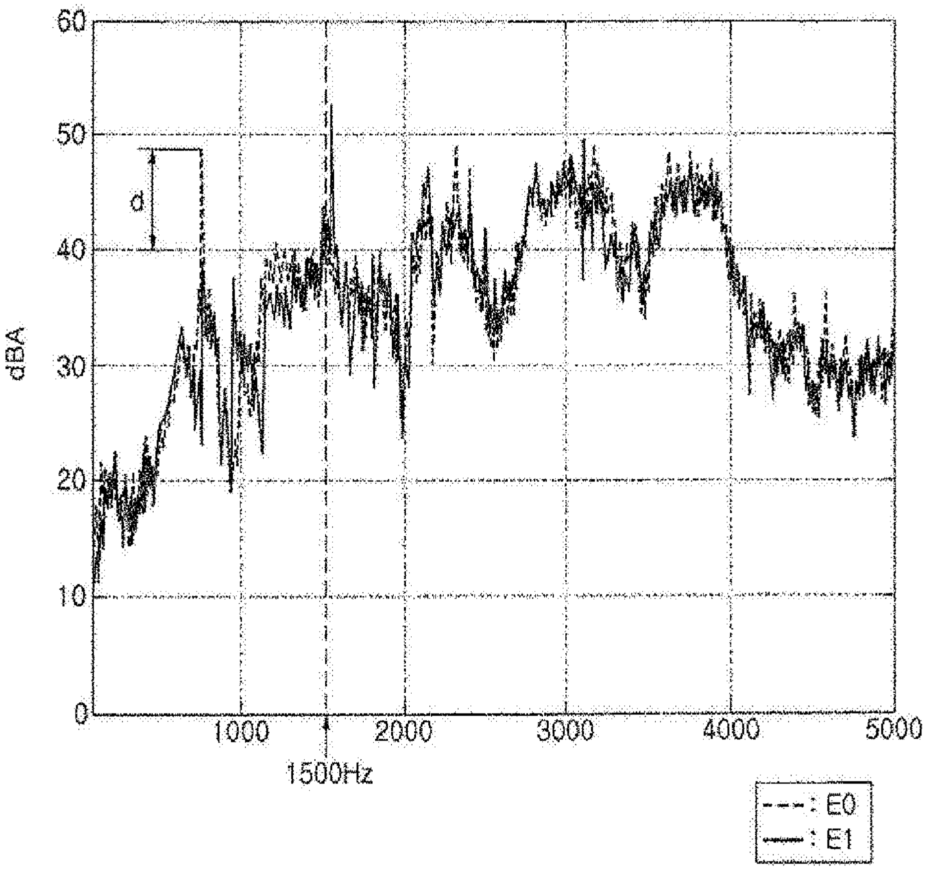
FIG. 9 is a graph in accordance with an experimental example, and shows a graph E0 representing a level (dBA: A-weighted decibel) of noise per frequency measured outside the cleaner 1 in the absence of an operation of a noise control module 80 and a graph E1 representing a level (dBA) of noise per frequency measured outside the cleaner 1 based on the operation of the noise control module 180 in accordance with the first embodiment.

FIG. 9 shows data experimentally confirming that reduced is a level of the noise of 1500 Hz or less of the noise generated when the fan module 50 or 50' is operated in a state where the noise control module 180 is operated. A peak value of a frequency range of 1500 Hz or less of the noise observed in an inactive state E0 of the noise control module is reduced by a d value (dBA) in a state E1 where the noise control module 180 is operated. The graphs E0 and E1 are logarithmic scales and the peak value plays a main role in an overall noise level of the frequency range of 1500 Hz or less. Therefore, the decrease by d of the peak value results in a significant reduction in an average noise level.

The noise control module 280 according to the second embodiment is configured to cause an additional sound to be added to a high frequency range of the noise emitted from the exhaust outlet 10*a*, 10*a'*. The noise control module 280 is configured to cause an output of the one or more speaker 89, 989 to increase a level of the noise of at least one frequency range of 2000 Hz or more and 8000 Hz or less when the fan module 50, 50' is operated. The noise control module 280 may be configured to cause the speaker to increase an average level of the noise of 2000 Hz or more and 8000 Hz or less. Since the user usually recognizes the noise of the cleaner of 2000 Hz or more and 8000 Hz or less as the noise generated when the cleaner is operating with good performance, if a level of the noise of 2000 Hz or more and 8000 Hz or less becomes reduced by a technical implementation, the user often misunderstands as if the cleaner is not operating well even though cleaning is being performed well. Therefore, by adding a noise in this frequency range, such misunderstanding can be solved.

The noise control module 280 is not necessarily required to provide with the detection unit. In addition, the noise control module 280 does not require the elements and the relevant signal processing as implemented in FIG. 8 (*a*) of the first embodiment.

The noise control module 280 may be configured to cause the speaker to emit a pre-stored specific sound when the fan module 50, 50' is operated.

Referring to FIG. 8 (*b*), the noise control module 280 may have a configuration of only a speaker controller 285 that performs only an on or off control. The speaker controller 285 may be configured to cause a specific sound file to be stored. The speaker controller 285 may be configured to adjust the intensity of an output of the one or more speakers 89 and 989.

The specific sound may be a sound in a specific frequency range of 2000 Hz to 8000 Hz. Through experiments with several users, the specific sound may be preset to a sound enhancing a feeling that cleaning is performed well.

The noise control module 380 according to the third embodiment is configured to reduce the intensity of the signal of a low frequency range of the noise emitted from the exhaust outlet 10*a*, 10*a*' and at the same time, add an additional sound to a high frequency range of the noise emitted from the exhaust outlet 10*a*, 10*a*'. That is, the function of the noise control module 380 includes the functions of the noise control module 180 and the noise control module 280. The noise control module 380 is configured to emit a pre-stored sound of a specific frequency range of 2000 Hz to 8000 Hz, and also control an output of the one or more speaker 89, 989 to reduce a level of the noise of at least one frequency range of 1500 Hz or less of the noise generated when the fan module is operated.

The noise control module 380 includes the configurations of FIG. 8 (*a*) described above. However, the signal processor 85 of the noise control module 380 generates a control signal by adding an additional sound signal to a signal obtained by reversely shifting in phase a signal detected by the detection unit 81, 81', and therefore, differs from the signal processor 85 of the noise control module 180.

Meanwhile, the cleaner provided with the noise control modules 180 and 380 can adjust the transfer function of the noise control modules 180 and 380 for each product using a virtual microphone method for each product in the process of mass product. Even if the same transfer function is preset to the signal processor 85, a tolerance of the detection unit, the fan module, or the like exists for each product, and therefore, noise reduction results may be different. For this purpose, the transfer function can be set of the signal processor 85 optimized for each product by measuring a total noise according to the operation of the noise control module by using a separate external microphone for each product. In this case, the transfer function means an algorithm that uses a detection signal of the detection unit 81, 81' as an input value and an output signal of the one or more speakers 89 and 989 as a resultant value.

Figure 10:
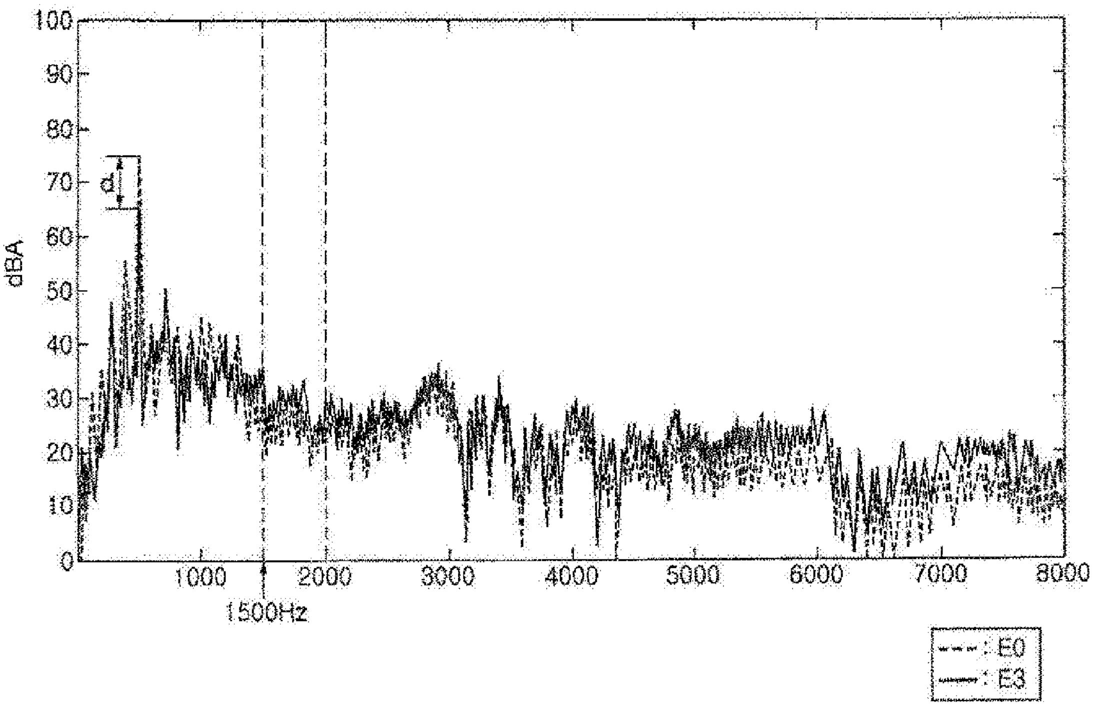
FIG. 10 is a graph in accordance with an experimental example, and shows a graph E0 representing a level (dBA) of noise per frequency measured outside the cleaner 1 in the absence of an operation of the noise control module 80 and a graph E3 representing a level (dBA) of noise per frequency measured outside the cleaner 1 based on the operation of the noise control module 380 in accordance with the third embodiment.

FIG. 10 shows data experimentally confirming that reduced is the noise of 1500 Hz or less of the noise generated when the fan module 50 or 50' is operated according to the operation of the noise control module 380. A peak value of a frequency range of 1500 Hz or less of the noise observed in an inactive state E0 of the noise control module becomes reduced by a d value (dBA) in a state E3 where the noise control module 380 is operated. A level of the noise of a frequency range of 2000 Hz to 8000 Hz of the noise observed in an inactive state E0 of the noise control module becomes increased by a considerable amount (f) in a state E3 in which the noise control module 380 is operated.

Hereinafter, referring to FIGS. 6A to 6*c*, embodiments A and B according to whether a sound conveying conduit 90 is provided or not will be described.

In embodiment A referring to FIGS. 6A and 6B, the sound conveying conduit is not provided. A speaker 89 is arranged in the direction opposite to the centrifugal direction of the surrounding area B1, B1' with respect to the axis O. The speaker 89 is disposed in the center area B2. The speaker 89 is disposed at a lower vertical height than the exhaust cover 12, 12'. The speaker 89 is disposed at an upper vertical height than the fan module 50, 50'.

In embodiment B referring to FIG. 6*c*, the cleaner 1 includes a sound conveying conduit 90 conveying the sound of the speaker 989 to the sound outlet 10*b*, 10*b*'. In FIG. 6*c*, illustrated is a noise control module 980 that includes a speaker 989 disposed relatively far from the sound outlet 10*b*, 10*b*'.

The sound conveying conduit 90 connects a start portion where the speaker 989 is disposed and an end portion where the sound outlet 10*b*, 10*b*' is disposed. The sound conveying conduit 90 forms a hollow passageway connecting the start portion and the end portion. A sound output from the speaker 989 is conveyed along a constant direction St by the sound conveying conduit 90 and is emitted through the sound outlet 10*b*, 10*b*'.

The sound conveying conduit 90 extends longer than the width of the cross-section perpendicular to the sound conveying direction St. The sound conveying conduit 90 extends longer than the width, in a main sound emission direction Ss, of the speaker 980. More specifically, the sound conveying conduit 90 extends longer than three times the width of the main sound emission direction Ss of the speaker 989.

The main sound emission direction Ss of the speaker 989 means a direction in which sound is most strongly emitted from the speaker 989 itself into the air. For example, the speaker 989 is provided with a vibration plate facing the main sound emission direction Ss, and cause the vibration plate to vibrate by using a moving coil or a piezoelectric vibration element. Therefore, sound is emitted in the main sound emission direction Ss.

The sound conveying conduit 90 extends longer than a straight-line distance between the sound outlet 10*b*, 10*b*' and the fan module 50, 50'. That is, the extending length of the sound conveying conduit 90 is longer than the straight-line distance between the sound outlet 10*b*, 10*b*' and the fan module 50, 50'.

In embodiment B, the speaker 989 may be disposed at any location outside a space between the sound outlet 10*b*, 10*b*' and the fan module 50, 50'. As a result, the length of the cleaner 1 in the direction of the axis O can be reduced, thereby the volume of the cleaner 1 can be effectively reduced. In this case, at least a portion of the sound conveying conduit 90 passes through a space between the sound outlet 10*b*, 10*b*' and the fan module 50, 50'.

The sound outlet 10*b*, 10*b*' may be formed on an upper surface of the main body 10, such as the top surface, and the fan module 50, 50' may be disposed at a lower vertical height than the sound outlet 10*b*, 10*b*' in the main body 10. As a result, the height of the cleaner 1 can be effectively reduced.

The sound conveying conduit 90 is configured to switch the sound conveying direction St. That is, the sound conveying conduit 90 may be configured so that the sound conveying direction St can be folded or bent. In this case, the sound conveying conduit 90 may extend longer than a straight-line distance between the sound outlet 10*b*, 10*b*' and the speaker 989.

The main sound emission direction Ss of the one or more speakers 89 and 989 may be arranged differently from an opposite direction Se of the sound outlet. In the present embodiment, the main sound emission direction Ss is forward and the opposite direction Se of the sound outlet is upward.

The sound conveying conduit 90 may include a direction-turning portion 93 switching the sound conveying direction St. A plurality of direction-turning portions 93 may be provided. In this embodiment, the direction-turning portion 93 is provided through which the sound conveying direction St is bent upwardly from the front.

In addition, the sound conveying conduit 90 includes an entrance passage portion 91 including the starting portion. The sound conveying conduit 90 includes an exit passage portion 95 having the end portion. The sound conveying conduit 90 may be configured by sequentially connecting the entrance passage portion 91, the direction-turning portion 93, and the exit passage portion 95.

At least a portion of the sound conveying conduit 90 is disposed in the main body 10. The exit passage portion 95 is disposed in the main body 10. The exit passage portion 95 is disposed in a space between the sound outlet 10*b*, 10*b*' and the fan module 50, 50'.

Another part of the sound conveying conduit 90 may be disposed outside the main body 10. Referring to the example of FIG. 6*c*, the entrance passage portion 91 may be disposed in the handle 30. In this case, the speaker 989 is disposed in the handle 30. The speaker 989 may be disposed in the extension portion 31. The speaker 989 may be disposed on a rear side of an inner space of the extension portion 31. A sound conveying conduit 90 extends from a space inside the extension portion 31 to the sound outlet 10*b*, 10*b*'. The sound conveying conduit 90 may be disposed inside the cleaner 1 and not be exposed from the outside. Specifically, the entrance passage portion 91 extends forwardly from the inside of the extension portion 31 along the extension portion 31. The front end of the entrance passage portion 91 is connected to the direction-turning portion 93, and the direction-turning portion 93 extends in such a manner that it is folded upwardly from the front. The front end of the direction-turning portion 93 is connected to the exit passage portion 95.

Although the speaker 989 according to the embodiment is described as being disposed in the handle 30, the position of the speaker can be disposed in any space in the cleaner 1 that is not interfered with other components. In this case, a sound output by the speaker can be conveyed to the sound outlet 10*b*, 10*b*' through the sound conveying conduit 90.

Although not shown, as another example, the speaker may be disposed inside the dust collector 13, and the sound conveying conduit 90 may extend in such a manner that it avoids the dust separation unit 20 and the fan module 50, 50'.

Although not shown, as more another example, the speaker may be disposed inside a housing for a separate speaker coupled to an upper portion of the entrance port 11, and a portion of the sound conveying conduit 90 may extend along the outer surface of the main body 10.

What is claimed is:

1. A cleaner comprising:

a main body forming an airflow path through which air is sucked and exhausted;

a dust separation unit disposed in the air flow path and separating dust from the air;

a fan module disposed in the airflow path and moving the air in the airflow; and a noise control module including a speaker and a detection unit for detecting noise or vibration and configured to control an output of the speaker to reduce a level of the noise of at least one frequency range of the noise generated when the fan module is operated, based on a detection signal of the detection unit, wherein the main body includes an exhaust outlet through which the air in the airflow path is exhausted and a sound outlet through which the sound of the speaker is exhausted, wherein the exhaust outlet and the sound outlet face the same direction relative to the main body, wherein the sound outlet is disposed at a center portion through which a predetermined axis passes, wherein the exhaust outlet is disposed in at least part of a surrounding area disposed to surround the axis, wherein the exhaust outlet extends along a circumferential direction or is arranged along the circumferential direction by being divided into a plurality of exhaust outlet segments, in the surrounding area which extends above a central angle of 180 degrees along the circumferential direction about the axis, and wherein the sound outlet is disposed in an opposite direction to a centrifugal direction of the surrounding area relative to the axis.

2. The cleaner according to claim 1, wherein the sound outlet is provided separately from the exhaust outlet.

3. The cleaner according to claim 1, further comprising a handle mounted on a rear surface of the main body, wherein the exhaust outlet and the sound outlet are formed on a top surface of the main body.

4. The cleaner according to claim 1, wherein the fan module includes:

an impeller pushing air; and a suction motor rotating the impeller, and wherein the detection unit is configured to detect frequency of noise or vibration of the suction motor.

5. The cleaner according to claim 1, wherein the speaker is disposed in the opposite direction to the centrifugal direction of the surrounding area relative to the axis.

6. The cleaner according to claim 1, wherein the sound outlet is spaced apart from the surrounding area in the opposite direction to the centrifugal direction and disposed in a predetermined center area through which the axis passes.

7. The cleaner according to claim 1, wherein the main body includes a plurality of exhaust guides for dividing the exhaust outlet into the plurality of exhaust outlet segments.

8. The cleaner according to claim 1, wherein the fan module includes an impeller pushing the air by rotating about the axis, and a suction motor rotating the impeller.

9. The cleaner according to claim 1, wherein the noise control module is configured to shift in phase a signal of at least one frequency range of 1500 Hz or less of signals detected by the detection unit, cause the speaker to output the phase shifted signal, and cause the noise of the at least one frequency range of 1500 Hz or less of the noise emitted from the exhaust outlet to be offset.

10. The cleaner according to claim 9, wherein the detection unit is disposed on a downstream portion of the fan module and on an upstream portion of the exhaust outlet, in the airflow path.

11. The cleaner according to claim 9, wherein the noise control module includes a low pass filter passing a low frequency signal of signals detected by the detection unit, relative to a preset value of 1500 Hz or less.

12. The cleaner according to claim 1, wherein the detection unit includes a microphone detecting noise, and wherein the noise control module is configured to receive a signal detected by the microphone by a feedback path and control an output of the speaker.

13. The cleaner according to claim 12, wherein the microphone is disposed outside the exhaust outlet.

14. The cleaner according to claim 13, wherein the microphone is disposed between the exhaust outlet and the sound outlet.

15. A cleaner comprising:

a main body forming an airflow path through which air is sucked and exhausted;

a dust separation unit disposed in the air flow path and separating dust from the air;

a fan module disposed in the airflow path and causing the air to flow; and a noise control module including a speaker and a detection unit for detecting noise or vibration, and configured to control an output of the speaker to reduce a level of the noise of at least one frequency range of noises generated when the fan module is operated, based on a detection signal of the detection unit, wherein the main body includes an exhaust outlet through which the air in the airflow path is exhausted and a sound outlet through which the sound of the speaker is exhausted, wherein the exhaust outlet is disposed on one surface of the main body and the sound outlet is disposed on the one surface of the main body on which the exhaust outlet is disposed, wherein the sound outlet is disposed at a center portion through which a predetermined axis passes, wherein the exhaust outlet is disposed in at least part of a surrounding area disposed to surround the axis, wherein the exhaust outlet extends along a circumferential direction or is arranged along the circumferential direction by being divided into multiple parts, in the surrounding area which extends above a central angle of 180 degrees along the circumferential direction about the axis, and wherein the sound outlet is disposed in an opposite direction to a centrifugal direction of the surrounding area relative to the axis.

16. The cleaner according to claim 15, wherein the sound outlet is provided separately from the exhaust outlet.

17. The cleaner according to claim 15, wherein the fan module includes an impeller pushing air, and a suction motor rotating the impeller, and wherein the detection unit is configured to detect frequency of noise or vibration of the suction motor.

18. The cleaner according to claim 15, wherein the speaker is disposed in the opposite direction to the centrifugal direction of the surrounding area relative to the axis.

* * * * *